(12) United States Patent
Pretty et al.

(10) Patent No.: US 10,507,932 B2
(45) Date of Patent: Dec. 17, 2019

(54) AUTOMATIC DEFLECTION LIMITING LATCHES FOR A THRUST REVERSER

(71) Applicant: ROHR, INC., Chula Vista, CA (US)

(72) Inventors: Michael Sean Pretty, Jamul, CA (US); John Moule, Spring Valley, CA (US); Joseph C. Zecca, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 412 days.

(21) Appl. No.: 15/622,325

(22) Filed: Jun. 14, 2017

(65) Prior Publication Data

US 2017/0275010 A1    Sep. 28, 2017

Related U.S. Application Data

(62) Division of application No. 14/466,706, filed on Aug. 22, 2014, now Pat. No. 9,708,073.

(51) Int. Cl.
| | | |
|---|---|---|
| *B64D 29/06* | (2006.01) | |
| *F02K 1/76* | (2006.01) | |
| *B64D 29/00* | (2006.01) | |
| *F01D 21/00* | (2006.01) | |
| *F02K 1/64* | (2006.01) | |

(52) U.S. Cl.
CPC ............. *B64D 29/00* (2013.01); *B64D 29/06* (2013.01); *F01D 21/00* (2013.01); *F02K 1/64* (2013.01); *F02K 1/766* (2013.01)

(58) Field of Classification Search
CPC ........ B64D 29/02; B64D 29/04; B64D 29/06; B64D 29/08; F02K 1/766; F02K 1/80; F02K 1/805; F02K 1/64–1/72; F02D 25/24; F02D 25/243

USPC .................................................. 415/126–128
See application file for complete search history.

(56) References Cited

U.S. PATENT DOCUMENTS

| | | | | |
|---|---|---|---|---|
| 4,697,763 | A |  | 10/1987 | Vermilye |
| 5,623,820 | A |  | 4/1997 | Balzer |
| 5,864,922 | A |  | 2/1999 | Kraft |
| 6,032,901 | A | * | 3/2000 | Carimali ................ B64D 29/06 244/129.4 |
| 6,045,091 | A | * | 4/2000 | Baudu .................... B64D 29/06 239/265.25 |
| 8,070,101 | B2 |  | 12/2011 | Vauchel |
| 2006/0145001 | A1 |  | 7/2006 | Smith |
| 2010/0107599 | A1 |  | 5/2010 | Vauchel |

(Continued)

OTHER PUBLICATIONS

USPTO; Non-Final Office Action dated Oct. 5, 2016 in U.S. Appl. No. 14/466,706.

(Continued)

*Primary Examiner* — Gerald L Sung
*Assistant Examiner* — Rene D Ford
(74) *Attorney, Agent, or Firm* — Snell & Wilmer, L.L.P.

(57) ABSTRACT

A nacelle may include a pylon and a thrust reverser having an inner fixed structure. A locking mechanism may automatically engage and prevent relative movement between thrust reverser halves. A bumper may be coupled to the inner fixed structure. The locking mechanism may limit deflections between the thrust reverser and the pylon in response to a burst duct. A locking mechanism in the inner fixed structure may include a pressure relief door and an arrestor which hooks onto a retaining bar in a pylon bracket. The locking mechanism may allow the thrust reverser halves to be opened for access to the engine.

2 Claims, 9 Drawing Sheets

(56) References Cited

U.S. PATENT DOCUMENTS

| | | |
|---|---|---|
| 2011/0014044 A1 | 1/2011 | Vauchel |
| 2011/0094204 A1 | 4/2011 | Bouillon |
| 2011/0174919 A1 | 7/2011 | Caruel |
| 2011/0174930 A1 | 7/2011 | Porte |
| 2011/0297787 A1 | 12/2011 | Guillaume |
| 2012/0097260 A1 | 4/2012 | Porte |
| 2012/0097261 A1 | 4/2012 | Porte |
| 2016/0053719 A1 | 2/2016 | Pretty |

OTHER PUBLICATIONS

USPTO; Notice of Allowance dated Mar. 14, 2017 in U.S. Appl. No. 14/466,706.

* cited by examiner

AUTOMATIC DEFLECTION LIMITING LATCHES FOR A THRUST REVERSER

CROSS-REFERENCE TO RELATED APPLICATIONS

This application is a Divisional of, and claims priority to U.S. application Ser. No. 14/466,706, entitled "AUTOMATIC DEFLECTION LIMITING LATCHES FOR A THRUST REVERSER," filed on Aug. 22, 2014, which is incorporated herein by reference in its entirety.

FIELD

The disclosure generally relates to turbofan propulsion systems for aircraft. More particularly, the disclosure relates to deflection limiting systems for a thrust reverser in a nacelle for a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a thrust reverser. The thrust reverser includes an inner fixed structure ("IFS") surrounding the engine which forms part of the interior surface of the bypass air duct through the thrust reverser. The IFS defines a core compartment that surrounds the engine. During various operating conditions, such as after a burst duct, pressure in the core compartment may exceed pressure in the bypass air duct. In these conditions, the radially outward net positive pressure on the IFS may lead to large, unacceptable deflections. Latches have been used to reinforce the IFS by either latching the IFS to the pylon or engine, or latching the IFS halves to each other, but these existing latches suffer from various disadvantages or insufficiencies.

SUMMARY

An aircraft nacelle is disclosed. The aircraft nacelle may comprise a first thrust reverser half and a second thrust reverser half. The first thrust reverser half and the second thrust reverser half may be rotatable about a hinge between a closed position in which the first thrust reverser half and the second thrust reverser half enclose a core compartment and an open position in which the first thrust reverser half and the second thrust reverser half are separated and allow access to the core compartment. A locking mechanism may be configured to prevent the first thrust reverser half from separating from the second thrust reverser half in response to an increase in pressure in the core compartment.

In various embodiments, the locking mechanism may comprise a bumper comprising a locking slot. The locking mechanism may comprise a centrifugal clutch. The locking mechanism may comprise a locking pin. The locking mechanism may comprise a pneumatic actuator. The aircraft nacelle may comprise an air supply line connecting a fan duct to the pneumatic actuator. The locking mechanism may comprise a bellows. A locking pin may be coupled to the bellows, wherein the locking pin is configured to enter a locking slot in the bumper. The aircraft nacelle may comprise a pressure relief door in the first thrust reverser half, wherein the pressure relief door comprises an arrestor hook. The arrestor hook may contact a retaining bar in a pylon bracket.

An aircraft nacelle is disclosed. The aircraft nacelle may comprise a first thrust reverser half configured to move relative to at least one of an opposite thrust reverser half, an engine, or a pylon in order to open the first thrust reverser half. A latch may be coupled to the first thrust reverser half and movable between a latched position in which the latch prevents relative movement between the first thrust reverser half and at least one of the opposite thrust reverser half, the engine, or the pylon, and an unlatched position in which the latch permits relative movement between the first thrust reverser half and at least one of the opposite thrust reverser half, the engine, or the pylon. The latch may latch automatically responsive to conditions of aircraft flight.

In various embodiments, the latch may latch automatically responsive to the pressure of the air inside a core compartment between the engine and the first thrust reverser half relative to the pressure of the air inside a bypass air duct in the first thrust reverser half. The latch may latch automatically responsive to the temperature of the air inside a core compartment between the engine and the first thrust reverser half. The latch may comprise a locking pin and a bumper. The latch may comprise a centrifugal clutch.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for limiting deflections in a nacelle with latches are disclosed below in accordance with various embodiments. During flight, an engine duct may burst resulting in increased pressures inside a core compartment surrounding the engine, or other conditions might exist which create a higher pressure inside of the core compartment than outside, resulting in a net force radially outward against the thrust reverser. Also, conditions might exist where a portion of the thrust reverser deflects and begins to scoop the high velocity air stream in the bypass air duct, which can result in pressures and forces difficult to control and provide challenges in ensuring the continued integrity of the thrust reverser structure. Latches may be employed to prevent deflections of the thrust reverser structures. A latch is preferable to a permanent mechanical attachment to reinforce the thrust reverser because the thrust reverser must be removable or openable by ground support personnel in order to reach the engine in the core compartment for inspection and servicing. However, a latching system can be difficult to deploy for this purpose as the required position of the latching mechanism may be inaccessible to ground support personnel, in which case the latching and unlatching of the system would be problematic. Remotely operated latching mechanisms have been proposed and used, but they may not be the ideal solution. Proposed herein are latching solutions which latch and/or unlatch automatically, without human intervention, to provide latch support when it is needed to prevent deflections of the thrust reverser structure, and to unlatch when the aircraft may need inspection or servicing.

Figure 1:
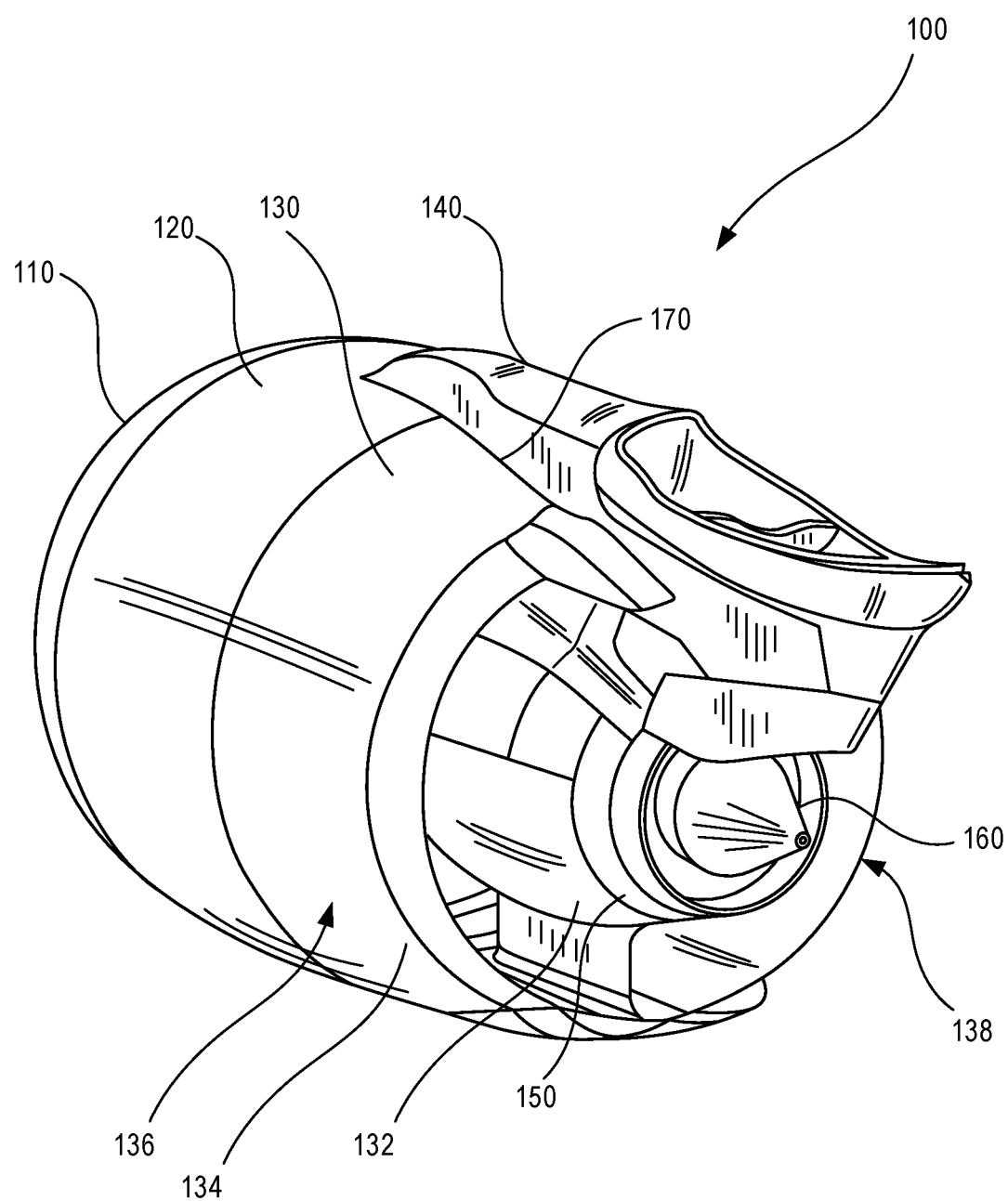
FIG. 1 illustrates a perspective view of a nacelle in accordance with various embodiments of the disclosure.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and an outer fixed structure ("OFS") 134. Bypass air from an engine fan may flow in a generally annular bypass air duct defined between the IFS 132 and the OFS 134. The IFS 132 may be formed together with or be coupled to at its aft end a core cowl 150, which in turn is adjacent to a nozzle 160 for core engine exhaust air. The thrust reverser 130 may further be split into a left half 136 and a right half 138, such that there is, for example, a left half and a right half of IFS 132. The left half 136 and the right half 138 may be hinged to the pylon 140 at hinges 170. The left half 136 and the right half 138 may hinge open at hinges 170 in order to provide access to the engine for inspection or servicing. The left and right halves of the IFS 132 may together help form a core compartment around the engine when the left and right halves 136, 138 of the thrust reverser are closed.

Figure 2:
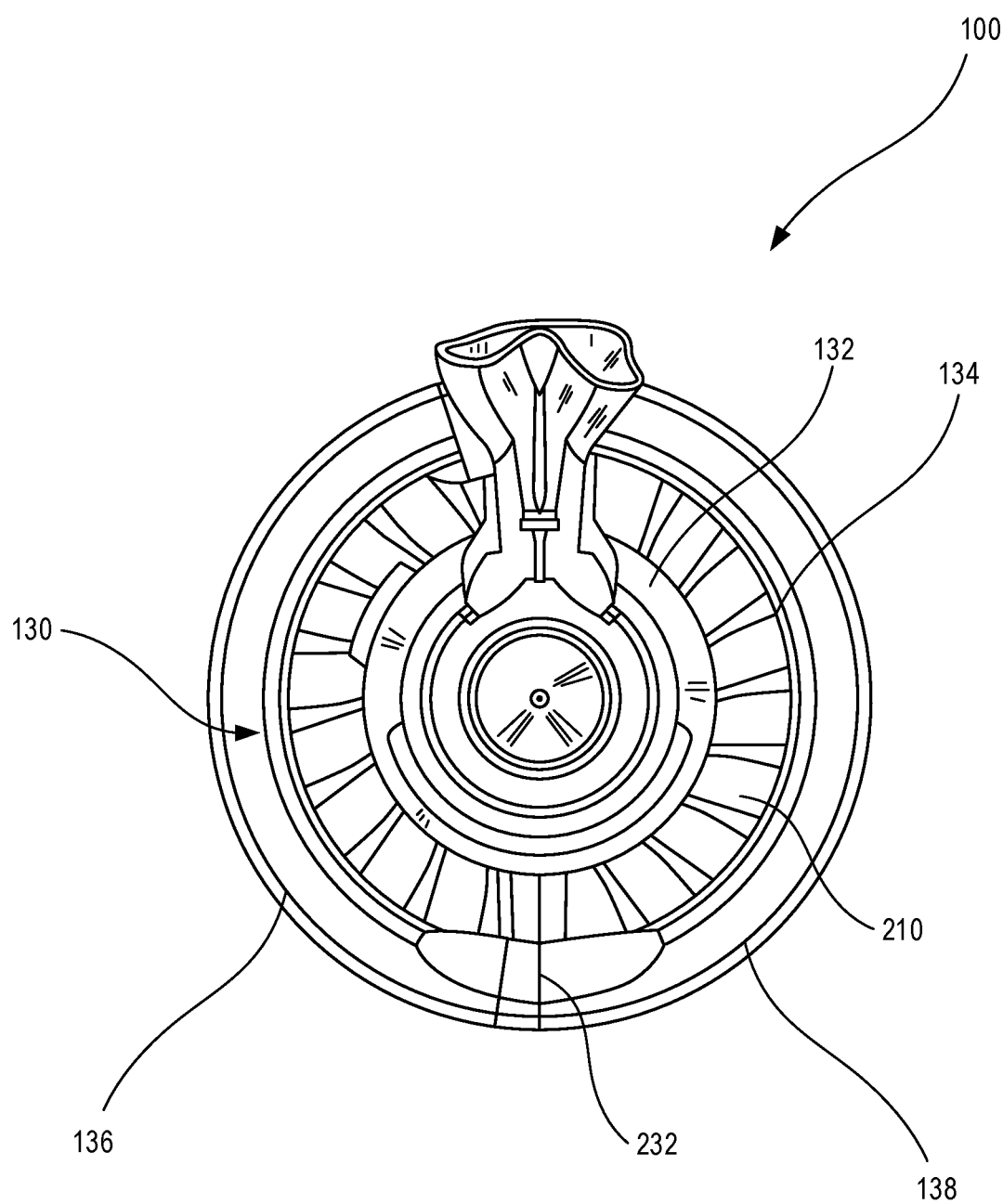
FIG. 2 illustrates an aft view of a nacelle in a closed position in accordance with various embodiments of the disclosure.

Referring to FIG. 2, an aft view of nacelle 100 in a closed position is illustrated according to various embodiments. Left half 136 and right half 138 of thrust reverser 130 may be split along split line 232. Engine fan 210 is visible through the bypass air duct between IFS 132 and OFS 134.

Figure 3:
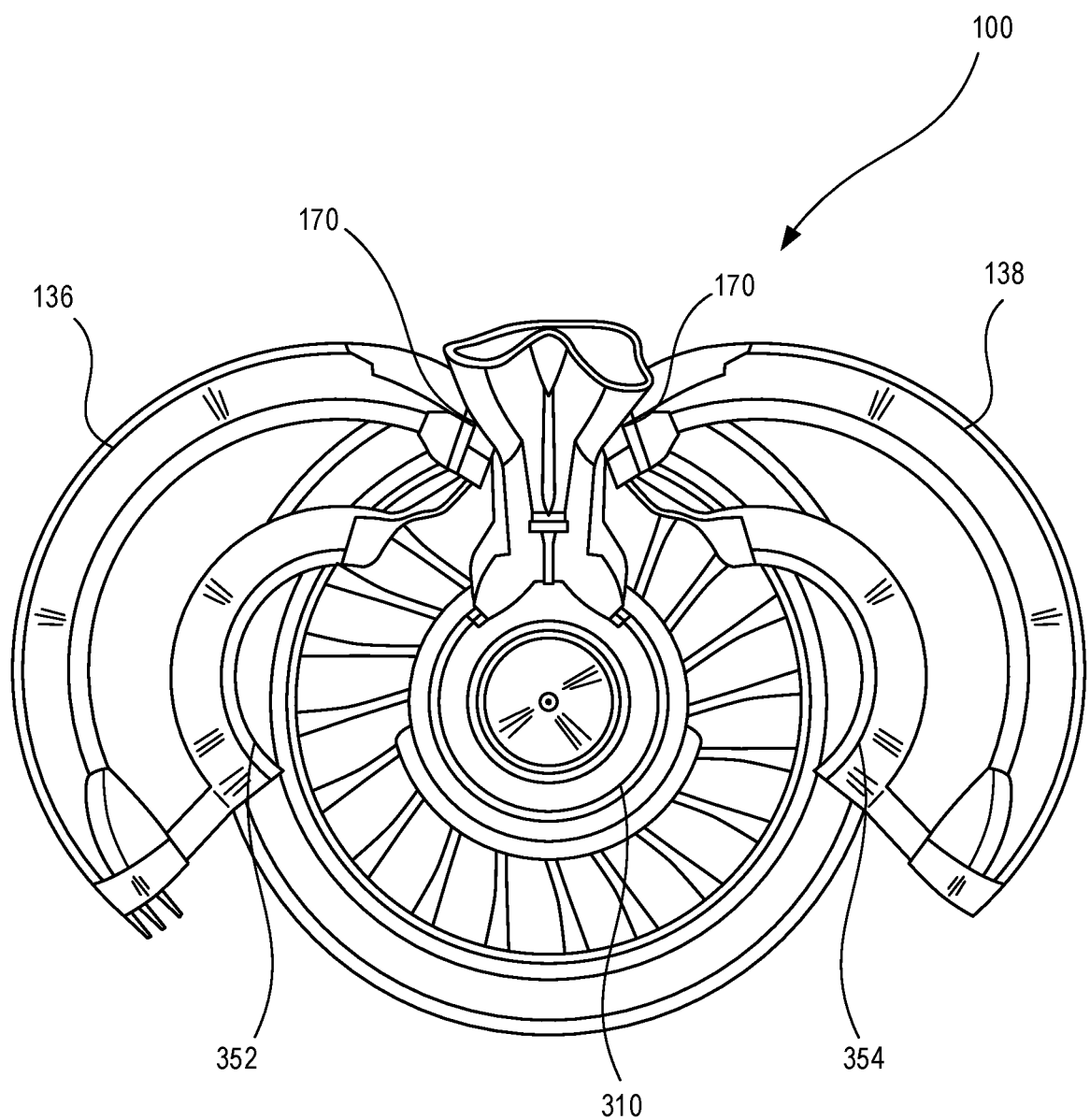
FIG. 3 illustrates an aft view of a nacelle in an open position in accordance with various embodiments of the disclosure.

Referring to FIG. 3, an aft view of nacelle 100 with the thrust reverser halves 136, 138 hinged open is illustrated according to various embodiments. Thrust reverser halves 136, 138 and core cowl halves 352, 354 are hinged open at hinges 170 in order to provide access to engine 310.

Figure 4:
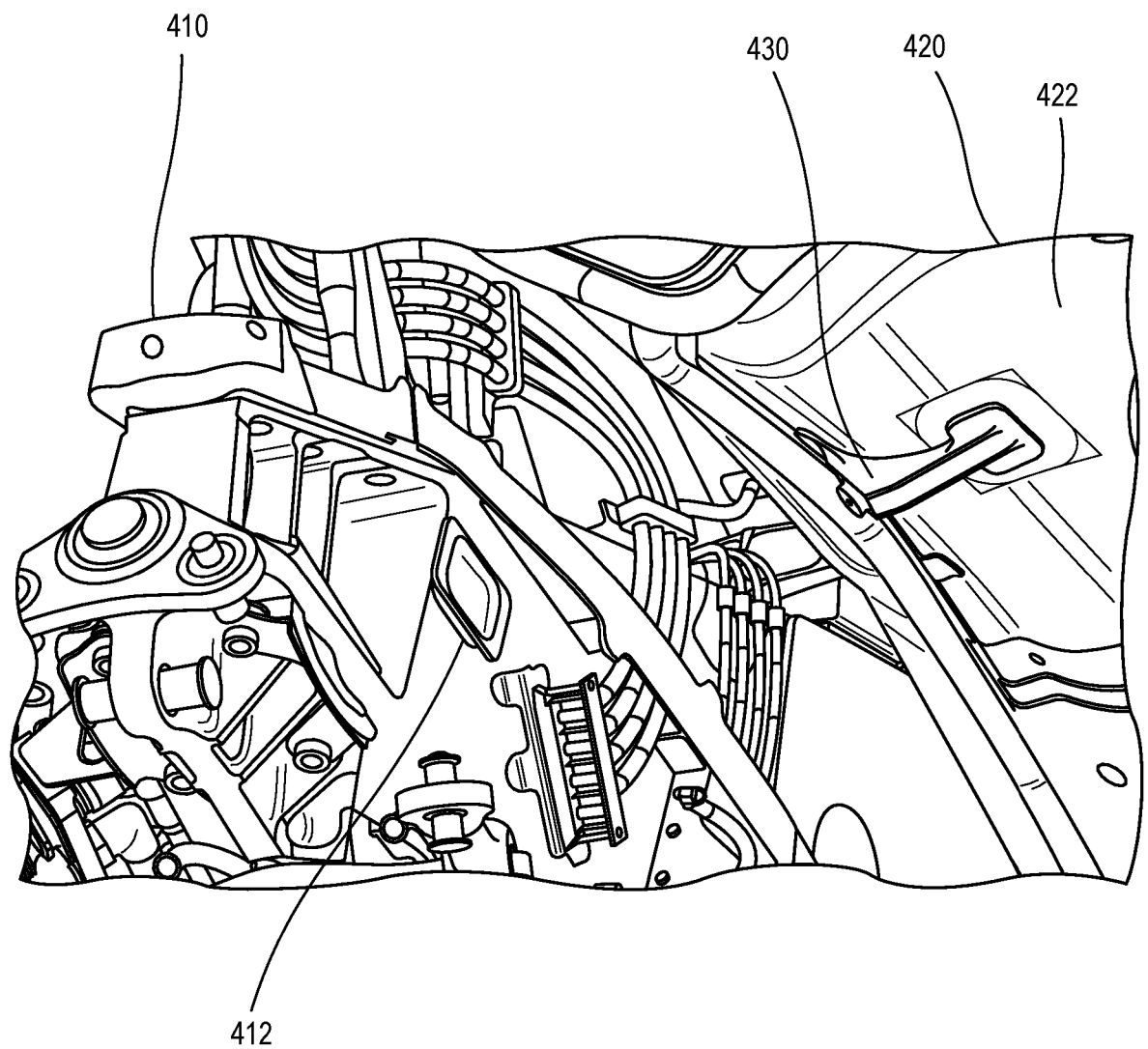
FIG. 4 illustrates a perspective view of a pylon and a thrust reverser having a bumper in accordance with various embodiments of the disclosure.

Referring to FIG. 4, a perspective view of a pylon 410 and a thrust reverser 420 having a bumper 430 is illustrated according to various embodiments. The bumper 430 may be coupled to the IFS 422 of the thrust reverser 420. In the closed position, the bumper 430 may contact an engagement feature 412 on the pylon. The bumper 430 may transmit loads from the thrust reverser 420 to the pylon 410.

Figure 5:
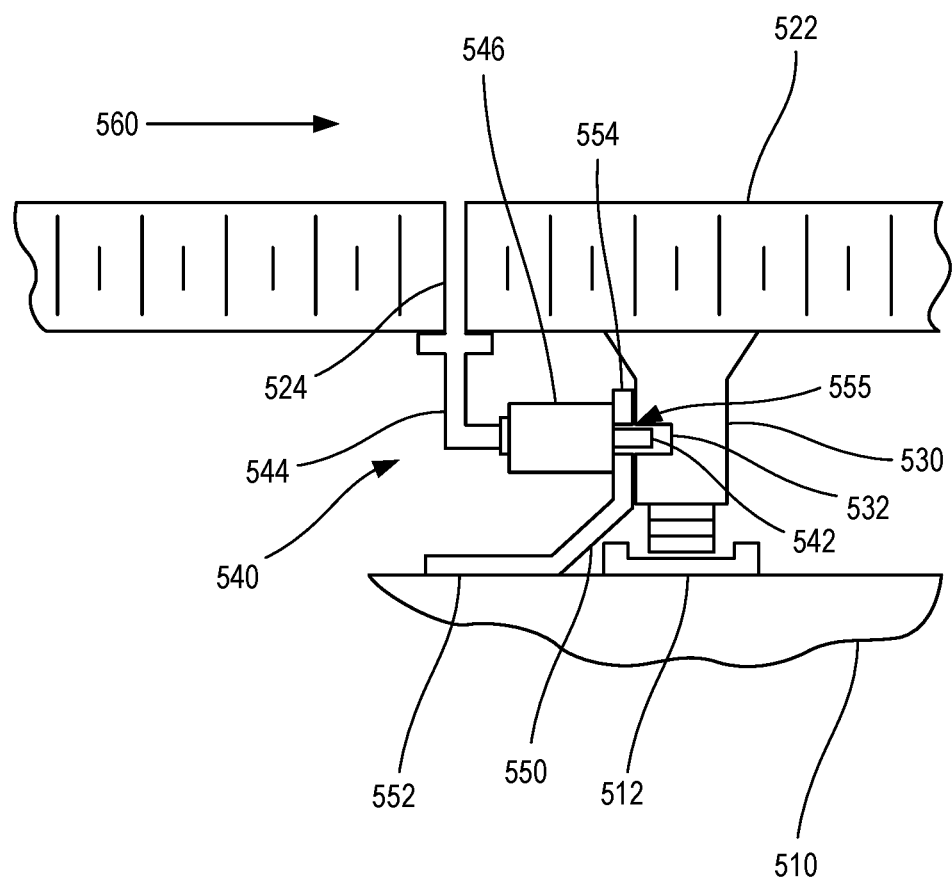
FIG. 5 illustrates a schematic view of a bumper and a pneumatic locking mechanism in accordance with various embodiments of the disclosure.

Referring to FIG. 5, a schematic view of an embodiment of an automatic latching mechanism is provided. A bumper 530 and a pneumatic locking mechanism 540 are illustrated according to various embodiments. The bumper 530 may be coupled to the IFS 522. The bumper 530 may contact the engagement feature 512 on the pylon 510. The bumper 530 may comprise a locking slot 532. The locking slot 532 may be configured to receive a locking pin 542. The pneumatic locking mechanism 540 may comprise an air supply line 544 and a pneumatic actuator 546. A bracket 550 may comprise a first portion 552 coupled to the pylon 510, and a second portion 554 adjacent to the bumper 530 in its closed position. The second portion 554 may comprise an aperture 555 configured to receive the locking pin 542. The pneumatic actuator 546 may be configured to drive the locking pin 542 through the aperture 555 and into the locking slot 532 in the bumper 530 during normal flight conditions. The pneumatic actuator 546 may be supplied with pressurized air via the air supply line 544. The air supply line 544 may form a seal with the IFS 522 in the closed position. During engine operation, relatively high pressure air in the bypass air duct 560 (e.g. air at a pressure greater than the air pressure inside the core compartment) may pass through a supply channel 524 in the IFS 522 and into the air supply line 544. The relatively high pressure air may cause the pneumatic actuator 546 to drive the locking pin 542 through the aperture 555 and into the locking slot 532. The locking pin 542 may prevent the bumper 530 and the IFS 522 from separating from the pylon 510. In response to the pressure decreasing in the fan duct 560, such as after engine shutdown, the locking pin 542 may retract through the aperture 555 and into the pneumatic actuator 546 and out of the locking slot 532 in the bumper 530 and permitting the bumper 530 and IFS 522 to separate from the pylon 510. The thrust reverser may then be opened in order to provide access to the engine. Thus, with this latch actuated the IFS 522 may be prevented from deflecting away from the pylon 510 in the case of increased pressure in the core compartment due to a burst duct or other condition. Of course, this would require provision to prevent the rapid increase in pressure inside of the core compartment from retracting the locking pin 542, such as perhaps a viscous delay feature inside of actuator 646 that slows down the rate of movement of the pin. Thus, the latching mechanism automatically latches without human intervention when needed during flight to provide a capability to prevent deflection of the IFS, and automatically retracts or unlatches when not needed so that the thrust reverser can be opened. In this case, the automatic latching and unlatching is responsive to the change in relative air pressure between the bypass air duct and the core compartment, when the air pressure increases in the bypass air duct due to normal engine operation, the latch engages. Although this latching mechanism is illustrated as extending between one IFS half (left or right) and the pylon using existing bumper structure, it could also be readily adapted as a latching mechanism which extends between one of the IFS halves and the engine, or between the two (left and right) IFS halves.

Figure 6:
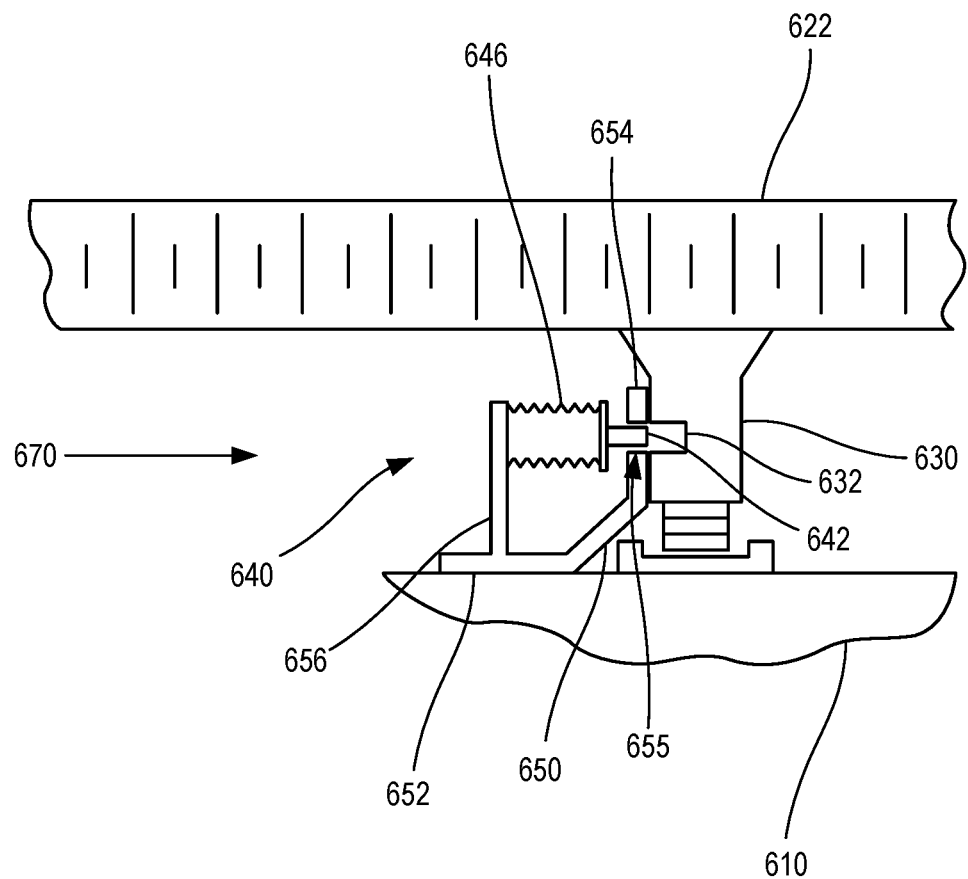
FIG. 6 illustrates a schematic view of a bumper and a bellows locking mechanism in accordance with various embodiments of the disclosure.

Referring to FIG. 6, a schematic view of a bumper 630 and a bellows locking mechanism 640 is illustrated according to various embodiments. The bellows locking mechanism 640 may comprise a bellows 646, a locking pin 642, and a bracket 650. The bracket 650 may comprise a first portion 652 coupled to the pylon 610, a second portion 654 adjacent to the bumper 630, and a third portion 656 coupled to the first portion 652 and the bellows 646. The second portion 654 may comprise an aperture 655 configured to receive the locking pin 642. The bellows 646 may be configured to drive the locking pin 642 into the locking slot 632 in the bumper 630. The bellows 646 may comprise an enclosed chamber filled with a gas, such as air or another suitable substance. During engine operation, the temperature in the core 670 may increase, and the gas temperature in the bellows 646 may increase as well. The increase in temperature in the bellows 646 may cause the bellows 646 to expand and drive the locking pin 642 into the locking slot 632. The locking pin 642 may prevent the bumper 630 from separating from the pylon 610. Thus, the IFS 622 may be prevented from deflecting away from the pylon 610. In response to the temperature decreasing in the core 670, such as after engine shutdown, the bellows 646 may compress and the locking pin 642 may retract out of the locking slot 632 in the bumper 630. The thrust reverser may then be opened in order to provide access to the engine. This latching mechanism also automatically latches and unlatches, without human intervention, in order to prevent the IFS from deflecting due to a burst duct or other condition when latched, and in order to permit the thrust reverser to open for inspection or maintenance when unlatched. Again, although illustrated as a latch extending between one half of the IFS and the pylon, this latch could also be readily adapted as a latch which extends between the IFS and the engine, or between the two IFS halves.

Figure 7:
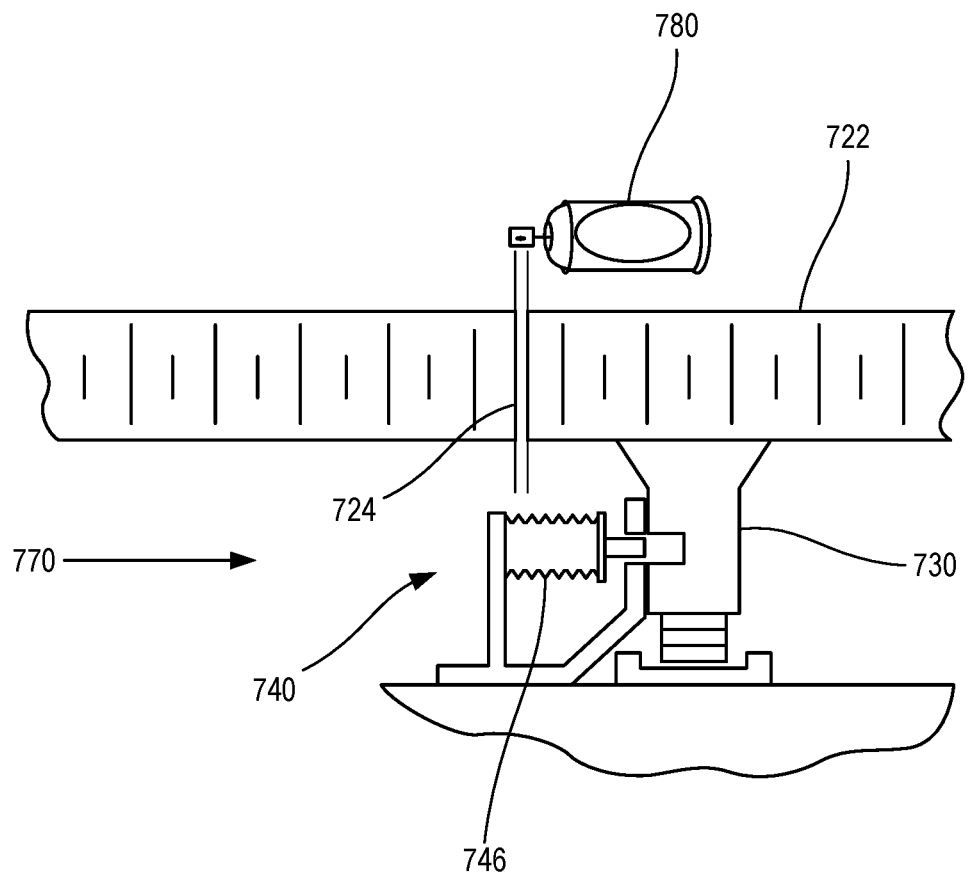
FIG. 7 illustrates a schematic view of a bumper and a bellows locking mechanism having a cooling port in accordance with various embodiments of the disclosure.

Referring to FIG. 7, a schematic view of a bumper 730 and a bellows locking mechanism 740 having a cooling port 724 is illustrated according to various embodiments. The bellows locking mechanism 740 may be similar to the bellows locking mechanism 640 illustrated in FIG. 6. The IFS 722 may comprise a cooling port 724. The cooling port 724 may allow compressed air from an external source 780 to be applied to the bellows 746 through the cooling port 724. The use of cooling air may decrease the wait time between engine shutdown and sufficient cooling of the bellows 746 in order for the thrust reverser to be opened. Additionally, the cooling port 724 may allow inspection of the core section 770. For example, a borescope may be inserted through the cooling port 724.

Figure 8A:
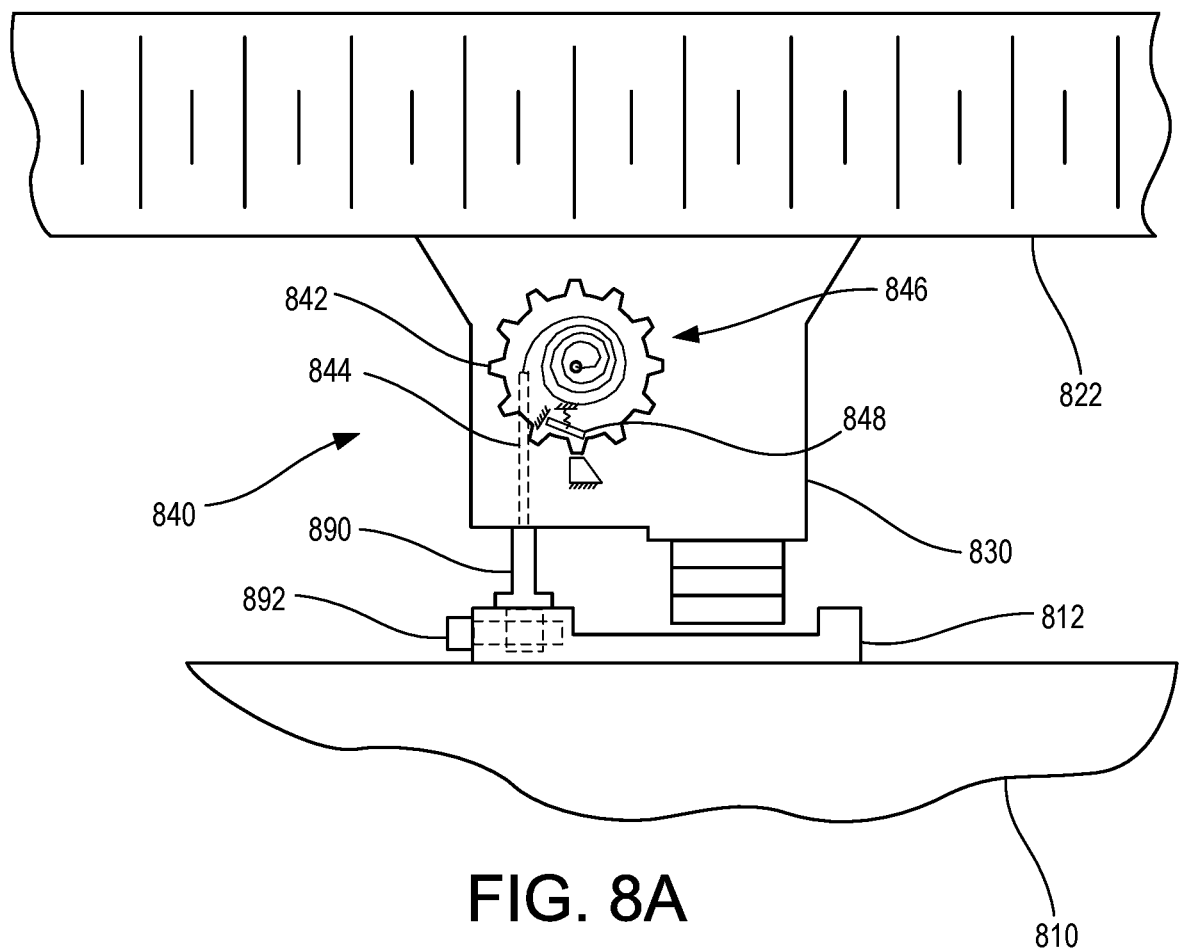
FIG. 8A illustrates a schematic view of a bumper and a centrifugal clutch locking mechanism in accordance with various embodiments.
Figure 8B:
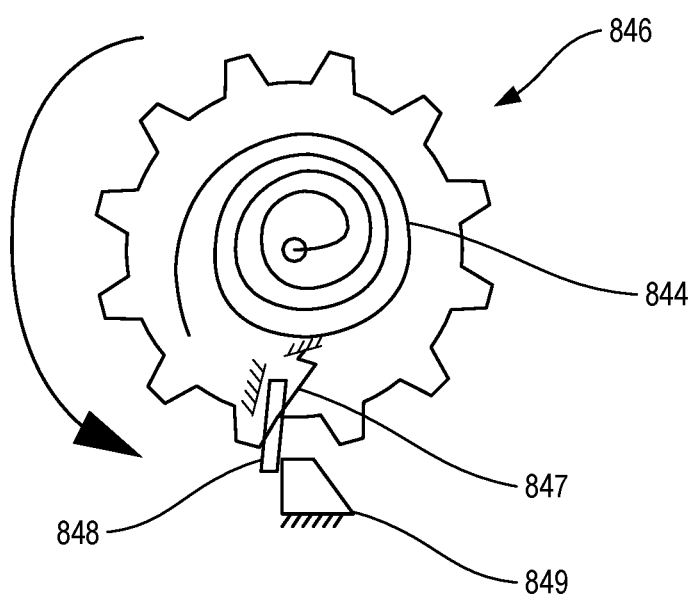
FIG. 8B illustrates a close-up view of a centrifugal clutch in accordance with various embodiments.

Referring to FIGS. 8A and 8B, a schematic view of a bumper 830 and a centrifugal clutch locking mechanism 840 is illustrated in FIG. 8A, and a close-up view of a centrifugal clutch 846 is illustrated in FIG. 8B according to various embodiments. A centrifugal clutch 846 may be coupled to the bumper 830. The centrifugal clutch 846 may allow the thrust reverser to be opened slowly, such as during inspection of the engine. However, in response to rapid movement of the thrust reverser, such as in the event of a burst duct, the centrifugal clutch 846 may lock and prevent further movement. Centrifugal clutches are commonly used in automobile seat belts, and many types of centrifugal clutches may be consistent with the present disclosure.

The centrifugal clutch 846 may comprise a spool 842, a strap 844 wound around the spool 842, and a lever 848 coupled to the spool 842 via a spring 847. The strap 844 may be coupled to the engagement feature 812 on the pylon 810 by a buckle 890. A pin 892 may be inserted through the buckle 890 to lock the buckle 890 to the engagement feature 812. In response to the IFS 822 rapidly moving away from the pylon 810, such as in the event of a burst duct, the strap 844 may apply a torque on the spool 842, causing the spool 842 to accelerate in a rotational direction. The acceleration may cause the lever 848 to move radially outward from the spool 842, and the lever 848 may contact a stop 849. Contact between the lever 848 and the stop 849 may prevent further rotation of the spool 842, and the centrifugal clutch 846 may prevent further movement of the IFS 822 away from the pylon 810. Thus, the centrifugal clutch locking mechanism 840 may limit deflection of the thrust reverser in a case such as a burst duct or other condition that rapidly increases the pressure in the core compartment and as a result the IFS is rapidly propelled radially outward from the core compartment and the strap 844 is rapidly paid out of the spool 842. In other circumstances, such as when the thrust reverser is slowly opened for inspection or maintenance, the strap 844 is paid out of the spool 842 much less rapidly, the centrifugal clutch will not lock and will allow the motion. Thus, this is another example of an automatic latching mechanism which latches automatically, without human intervention, to protect the thrust reverser from too much deflection, and also unlatches in order to permit opening of the thrust reverser.

Figure 9:
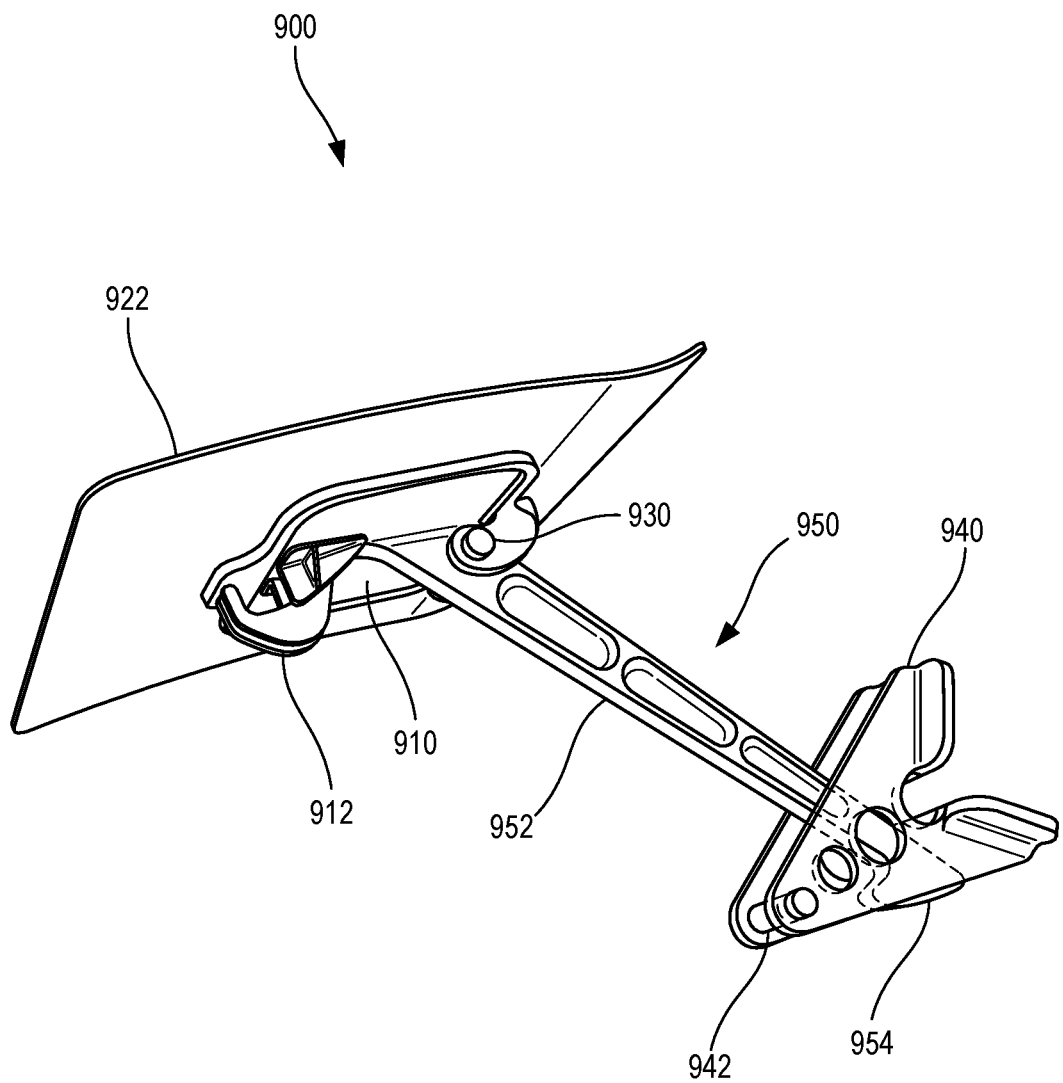
FIG. 9 illustrates a pressure relief assembly in accordance with various embodiments.

Referring to FIG. 9, a pressure relief assembly 900 is illustrated according to various embodiments. The pressure relief assembly 900 may comprise a pressure relief door 910 located in an IFS 922 of a thrust reverser. The pressure relief door 910 may be configured, in a manner well known to those of skill in this art, to open in the event of an increase of air pressure in the core compartment, such as in the event of a burst duct. The open pressure relief door 910 will help relieve the internal pressure in the core compartment. The pressure relief door 910 may comprise a latch 912. The latch 912 may comprise a spring which applies a preload to the pressure relief door 910. In response to an increase in pressure in the core, the latch 912 may release causing the pressure relief door 910 to swing open around a pivot joint 930. The pressure relief door 910 may be coupled to an arrestor arm 950. The arrestor arm 950 may comprise an elongated shaft 952 and a hook 954 at the end of shaft 952. The pressure relief door 910 and the arrestor arm 950 may rotate about the pivot joint 930 together. When the arrestor arm 950 rotates due the opening of the pressure relief door 910, the hook 954 may contact a retaining bar 942 mounted to a pylon bracket 940. The pylon bracket 940 may be coupled to a pylon. The contact between the hook 954 and the retaining bar 942 may prevent deflection between the thrust reverser and the pylon. Thus, this is another example of an automatic latching mechanism which latches automatically, without human intervention, to protect the thrust reverser from too much deflection. This latch could be unlatched on the ground by ground personnel through applying force to the pressure relief door 910 to return it to its closed position. The closing of this latch is caused by the increase in pressure of the air inside the core compartment relative to the air pressure in the bypass air duct, which first causes opening of the pressure relief door 910 and simultaneous latching of the latch.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An aircraft nacelle comprising:
   a first thrust reverser half and a second thrust reverser half, wherein the first thrust reverser half and the second thrust reverser half are rotatable about a hinge between a closed position in which the first thrust reverser half and the second thrust reverser half enclose a core compartment, and an open position in which the first thrust reverser half and the second thrust reverser half are separated and allow access to the core compartment; and
   a locking mechanism configured to automatically engage and prevent the first thrust reverser half from separating from the second thrust reverser half in response to an increase in pressure in the core compartment, wherein the locking mechanism comprises a centrifugal clutch.

2. An aircraft nacelle comprising:
   a first thrust reverser half configured to move relative to at least one of an opposite thrust reverser half, an engine, or a pylon in order to open the first thrust reverser half; and
   a latch coupled to the first thrust reverser half and movable between a latched position in which the latch prevents relative movement between the first thrust reverser half and at least one of the opposite thrust reverser half, the engine, or the pylon, and an unlatched position in which the latch permits relative movement between the first thrust reverser half and at least one of the opposite thrust reverser half, the engine, or the pylon;
   wherein the latch comprises a centrifugal clutch and latches automatically responsive to conditions of aircraft flight.

* * * * *